United States Patent [19]

Haramaki

[11] Patent Number: 4,525,059

[45] Date of Patent: Jun. 25, 1985

[54] EXPOSURE APPARATUS TO GUIDE REFLECTED LIGHT FROM A SUBJECT TO A PHOTOSENSITIVE BODY

[75] Inventor: Toshio Haramaki, Yokohama, Japan

[73] Assignee: Tokyo Shibaura Denki Kabushiki Kaisha, Japan

[21] Appl. No.: 425,992

[22] Filed: Sep. 28, 1982

[30] Foreign Application Priority Data

Nov. 4, 1981 [JP] Japan .................. 56-176906

[51] Int. Cl.³ .......................................... G03G 15/04
[52] U.S. Cl. ........................................ 355/8; 355/51; 355/67
[58] Field of Search ................... 355/8, 11, 49, 50, 51, 355/66, 67, 71, 75

[56] References Cited

U.S. PATENT DOCUMENTS 4,375,331  3/1983  Tohyama et al. ................ 355/51

FOREIGN PATENT DOCUMENTS 3021460  12/1980  Fed. Rep. of Germany .

Primary Examiner—Laramie E. Askin
Assistant Examiner—J. Pendegrass
Attorney, Agent, or Firm—Cushman, Darby & Cushman

[57] ABSTRACT

In an exposure apparatus, there is provided projecting means for projecting first and second light beams, in one direction and in another direction, onto an exposure region of a loading board. A mask member is provided between the loading board and the projecting means. The mask member is provided with a shielding member having a white colored face and a supporting member for supporting the shielding member. The shielding member shields, by its white colored face, one portion of the exposure region from the first light beams, and extends along the advancing direction of the second light beams so as to permit the passage therethrough of portion of said second light beams which advances toward the exposure region. The supporting member is formed with a hole permitting the passage therethrough of the second light beams. The lights reflected from the exposure region are guided to a photosensitive member through a guide means.

14 Claims, 9 Drawing Figures

EXPOSURE APPARATUS TO GUIDE REFLECTED LIGHT FROM A SUBJECT TO A PHOTOSENSITIVE BODY

BACKGROUND OF THE INVENTION

This invention relates to an exposure apparatus, and more particularly to an exposure apparatus for use in a copying apparatus.

Generally, a copying apparatus equipped with an exposure apparatus having an automatic belt-type document feeding mechanism is used to copy a sheet-like document without expending a large amount of time and labor. This document feeding mechanism is designed to automatically carry the document to an exposure region along an exposure table and a belt-like cover, keeping the document in place.

In a prior art exposure apparatus provided with such an automatic belt-type document feeding mechanism, when the document reaches a position immediately before a forward end portion of the exposure region, that is, when the document is carried with some delay, the lights irradiated onto this forward end portion are allowed to illuminate that portion of the carrying belt which is located above the forward end portion. Although this type of carrying belt is generally colored white, it begins to stain as the frequency of its use is increased. The prior art exposure apparatus, therefore, has a drawback in that the stained portions of the carrying belt are projected onto a copy paper to blur the same. In the prior art, therefore, a white colored mask member is provided at the forward end portion of the exposure table so as to prevent the carrying belt from being copied. With such a construction, even when the document is carried with some delay, the white colored face of the mask member was copied onto the copy paper, thereby preventing the carrying belt from being copied.

This type of prior art exposure apparatus is shown in FIG. 1. In the prior art exposure apparatus 10, beneath a forward end portion of an underside 14 of a loading board 12 to be loaded with document 22 thereon a white colored mask plate 16 is mounted parallel to the loading board 12. This mask plate 16 is disposed so that it may shield the lights projected onto a forward end portion V of the exposure region and so that its white colored face H may be exposed at all times in place of such forward end portion V of the exposure region.

However, when a main body 17 is moved in a direction indicated by the arrow T and the document 22 is thereby exposed sequentially from an adjoining portion PW of the document 22 to a forward end portion PV thereof, a shadow of the mask plate 16 is produced in a portion W of the exposure region, as shown in FIG. 1, with the result that a difference in quantity of light is produced between the lights directed toward the portion S of the exposure region and those directed toward the portion W thereof. That is, the portion S of the exposure region is projected with first light beams emitted from a lamp 18 and reflected from a first reflector 20 as well as second light beams irradiated from a second reflector 21. However, the portion W of the exposure region is projected only with the first light beams, said second light beams being shielded by the mask plate 16. The light beams reflected from the portions PS and PW of the document 22 are guided, through a mirror 24, to a photosensitive member (not shown). Particularly where the quantity of light for exposure is decreased in some cases by being adjusted in accordance with the density of the document 22 and in other cases by production of a stain on the exposure lamp, a difference in the quantity of exposure lights between the portions S and W appears as a density difference (CS and CW indicated on a copy paper 26).

That is, where the prior art exposure apparatus 10 is used, copying the document 22 shown in FIG. 2 disadvantageously results in the formation, on the copy paper 26, of such a blurred copy image as shown in FIG. 3.

SUMMARY OF THE INVENTION

Accordingly, the object of the invention is to provide an exposure apparatus which makes it possible to obtain a copy image having no blur and which is not affected by variation in the quantity of light from the exposure lamp.

According to one aspect of the invention, there is provided an exposure apparatus which comprises a loading board made of a transparent material and having an exposure region to be illuminated with light; means for projecting first light beams to the exposure region in one direction and second light beams to the same in another direction, thereby illuminating the exposure region with light beams; mask means having a shielding member and a support member supporting the shielding member and permitting the passage therethrough of the second light beams, said shielding member having a white colored face for shielding one portion of the exposure region from the first light beams; and guide means for guiding the light beams reflected from the exposure region to the photosensitive body.

DETAILED DESCRIPTION OF THE PREFERRED EMBODIMENTS

One embodiment of the invention will now be described in detail with reference to FIGS. 4 to 8.

Figure 1:
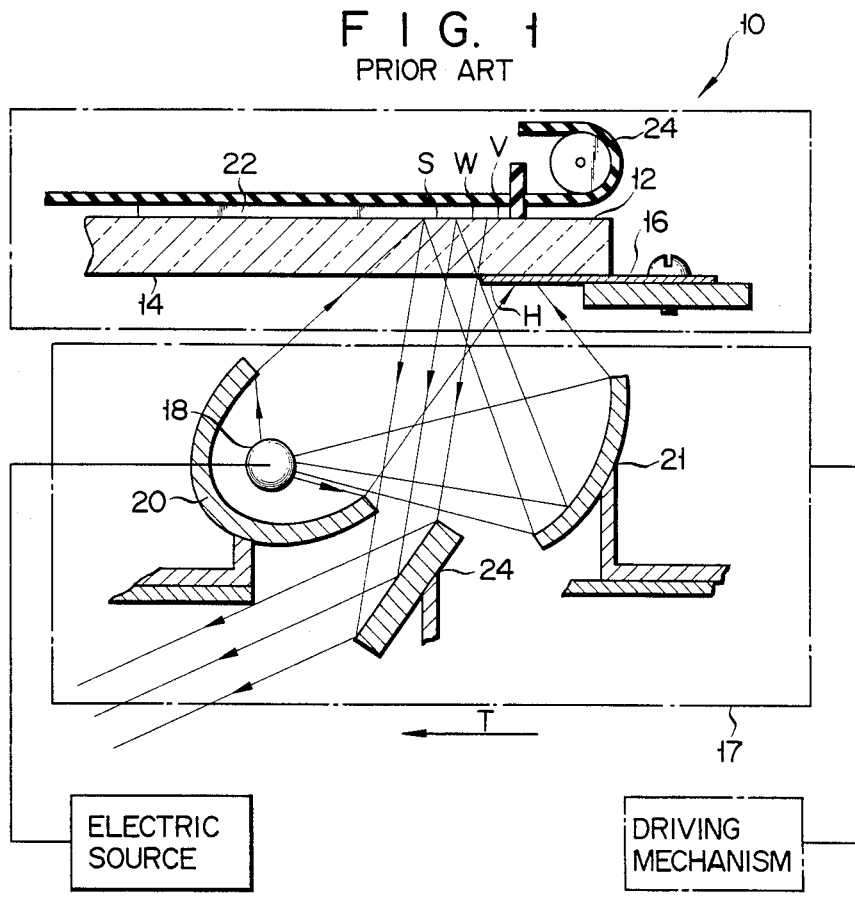
FIG. 1 is a schematic sectional view of a prior art exposure apparatus.
Figure 2:
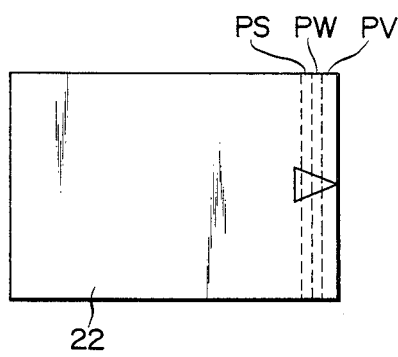
FIG. 2 is an upper surface view of the document shown in FIG. 1.
Figure 3:
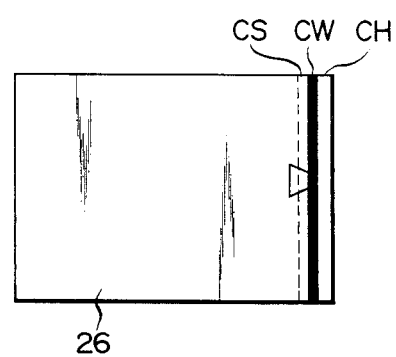
FIG. 3 is an upper surface view of a copy paper obtained when the document shown in FIG. 2 is copied using the prior art exposure apparatus shown in FIG. 1.
Figure 4:
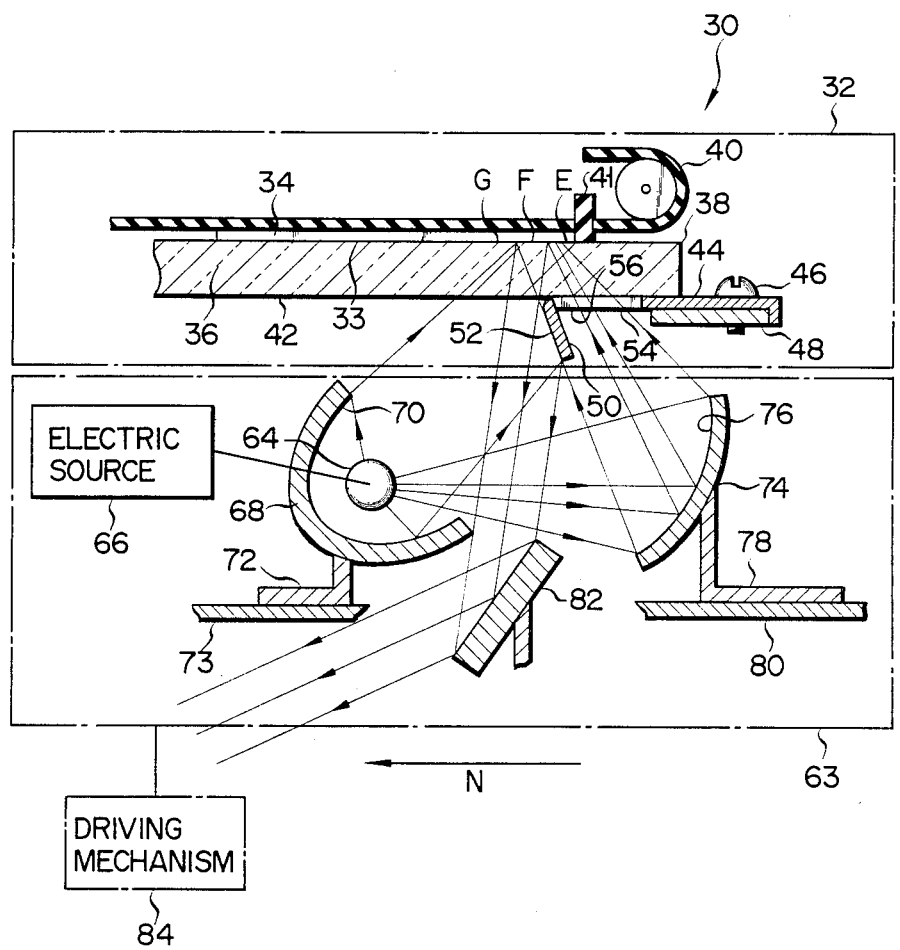
FIGS. 4 and 5 are schematic sectional views, respectively, of an exposure apparatus according to one embodiment of the invention.

In FIG. 4, an exposure apparatus 30 according to an embodiment of the invention is shown. This exposure apparatus 30 comprises an exposure table 32 and a main body 63 located beneath the exposure table 32 and having a projecting means. In the exposure table 32 there is provided a loading board 36 formed of transparent glass and having loaded thereon a document 34 to be copied. Above an upper surface 38 of the loading board 36, an automatic conveyor belt 40 is provided. This automatic conveyor belt 40 is formed of rubber and automatically carries the document 34 inserted from the left side (not shown) of the loading board 36 while keeping the same in sliding contact with the upper surface 38 of the loading board 36, until a forward end of the document 34 abuts against a stopper 41 defining the forward end of an exposure region 33. On an underside 42 of the loading board 36, a mask plate 44 is fixed by a screw 46 to the exposure table 32 through a member 48.

Figure 6:
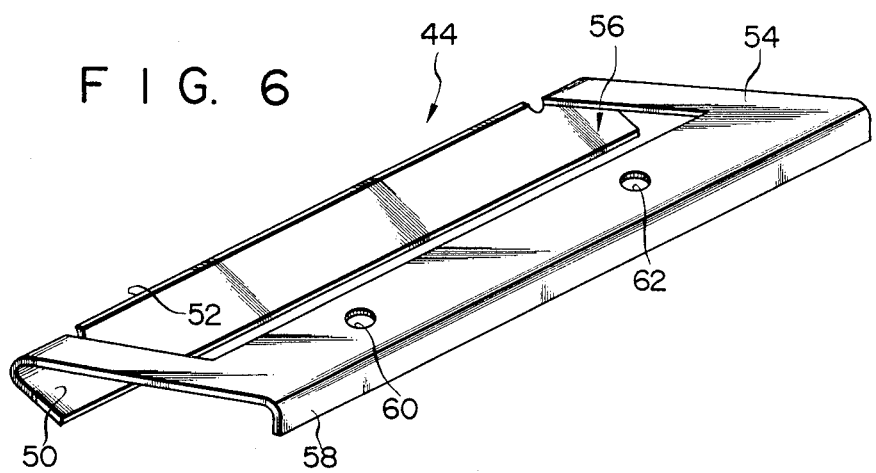
FIG. 6 is a perspective view of the mask member provided in the exposure apparatus shown in FIGS. 4 and 5.
Figure 7:
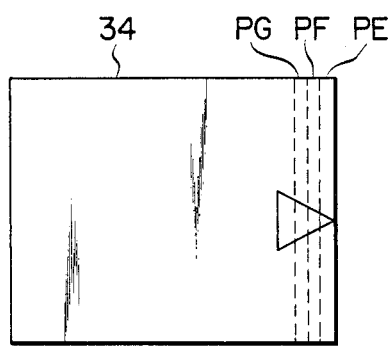
FIG. 7 is a top view of the document shown in FIG. 5.

Hereinunder, the mask plate 44 will be described in detail by referring to FIG. 6. The mask plate 44 is comprised of a shielding portion 50 and a supporting portion 54. The mask plate 44 is formed of a single opaque member such as, for example, a metal plate. The shielding portion 50 extends along the optical axis of second light beams as later described so as to permit the passage therethrough of those of said second light beams advancing toward the exposure region 33 and to shield the passage of first light beams (as later described) advancing toward the forward end portion of the exposure region 33. The surface 52 of this shielding portion 50 is subjected to white coating so that when the shielding portion cuts off the passage of part of said first light beams advancing toward the forward end portion of the exposure region 33, a copy paper may be copied, at its forward end portion, with a white colored surface at all times by copying the resulting white shielding portion in place of the forward end of the exposure region 33. The supporting portion 54 of the mask plate 44 is formed with a hole 56 so as to permit the passage through this mask plate 44 of part of the second light beams (as later described) advancing toward the exposure region 33. The hole 56, in this embodiment, is formed into a square shape so as to conform with the shape of the exposure region 33. The supporting portion 54 of the mask 44 is formed with screw holes 60 and 62 so as to be screwed to the member 48 of the exposure table 32. Further, the supporting portion 54 is bent at one side 58 so that when the mask plate 44 is screwed to the member 48 of the exposure table 32, it may be reliably fixed thereto by being engaged therewith.

By referring again to FIG. 4, this embodiment will continue to be described. Beneath the exposure table 32, there is provided the main body 63 capable of making a reciprocating movement in a direction indicated by the arrow N. Within the main body 63, there is provided an exposure lamp 64 used to emit light beams toward the exposure region 33. This exposure lamp 64 is connected to a power source 66. For the exposure lamp 64, a first reflector 68 is provided at an interval from the same. A surface 70 of the first reflector 68 is formed into a curved face so that it may reflect, in converged form, part of the light beams emitted from the exposure lamp 64. Thus, the light beams reflected from the first reflector 68 and the light beams emitted from the exposure lamp 64 are projected, as the first light beams, onto the exposure region 33 in one direction and with a specified width. The first reflector 68 is fixed to the main body 63 through supporting members 72 and 73.

A second reflector 74 is provided at an interval from the first reflector 68. This second reflector 74 reflects part of the light beams emitted from the exposure lamp 64, toward the exposure region 33 from a direction different from that in which the first light beams illuminate the exposure region 33. A surface 76 of the second reflector 74 is formed into a curved face so as to converge part of the light beams emitted from the exposure lamp 64 and reflect them as the second light beams. Therefore, the first and second light beams are overlapped with a specified width. The second reflector 74 is secured to the main body 63 through supporting members 78 and 80.

Between the first reflector 68 and the second reflector 74 and at a position lower than these reflectors, a mirror 82 is provided. This mirror is fixed to a frame (not shown) of the exposure apparatus so as to reflect the light beams irradiated onto the document 34 toward a photosensitive body (not shown).

To the main body 63, there is coupled a drive mechanism 84 for causing the main body to make a reciprocating movement in the direction indicated by the arrow N.

Figure 5:
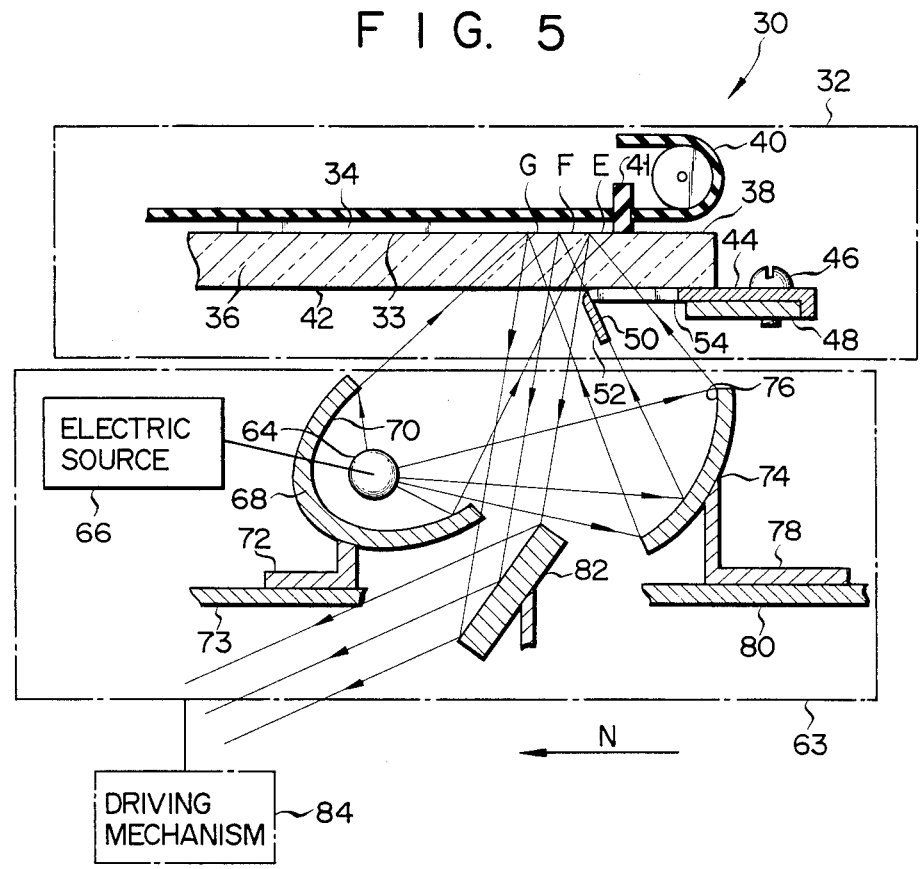

There will now be described the operation of the exposure apparatus 30 according to this first embodiment with reference to FIGS. 4 and 5.

As shown in FIG. 4, the document 34 (shown in FIG. 7) is carried by the automatic conveyor belt 40 to the exposure region 33 of the loading board 36 and is set to have its forward end allowed to abut against the stopper 41.

For clarifying the description of this embodiment, the exposure region 33 is divided in the sequential order in which the exposure is carried out. That is, a forward end portion of the exposure region 33 is represented by an alphabet character E, an adjoining portion to this portion E is represented by an alphabet character F, and an adjoining portion to this portion F is represented by an alphabet character G. The portions of the document 34 (shown in FIG. 7) corresponding to those portions E, F and G of the exposure region 33 are denoted by characters PE, PF and PG, respectively. The notations C52, CF and CG assigned to the portions of a copy paper 86 shown in FIG. 8 designate copy images of the white colored face 52 of the shielding portion 50, and the portions PF and PG of the document, respectively, in the order mentioned.

As shown in FIG. 4, upon starting the exposure, the white colored face 52 of the shielding portion 50 and the portion PF of the document 34 are initially subjected to exposure as indicated on the copy paper 86 by the notations C52 and CF. At the time of starting the exposure, the light beams emitted from the exposure lamp 64 are partially reflected by the first reflector 68. The reflected light beams constitute the said first light beams together with the light beams emitted directly from the exposure lamp 64. The first light beams illuminate the document portion PF and the white colored face 52. Another part of the light beams emitted from the exposure lamp 64 is irradiated toward the second reflector 74. The light reflected from the second reflector 74 constitutes the said second light beams and illuminates the exposure region 33. Part of said second light beams passes through the hole 56 formed in the supporting portion 54 to overlap said first light beams and to illuminate the portion PF of the document.

The portion PF of the document 34 exposed to the said parts of the first and second light beams in the above-mentioned manner reflects these light beams toward the mirror 82. The mirror 82 further reflects those reflected light beams toward the photosensitive body (not shown).

Thus, the portion F of the exposure region 33, that is, the portion PF of the document 34 is exposed to part of the first light beams and part of the second light beams. Further, the forward end E of the exposure region 33, that is, the forward end portion PE of the document 34 is optically replaced by the white colored face 52 of the shielding portion 50 when it is subjected to light exposure. Accordingly, the portion PE of the document 34 shown in FIG. 7, when the document 34 is copied, is developed into a white portion as shown in FIG. 8 by the notation C52.

Next, the main body 63 is moved, in the direction indicated by arrow N, from its position of FIG. 4 at which exposure is started. At this time, part of the first light beams and part of the second light beams illuminates the portions PF and PG of the document as shown in FIG. 5. That is, the first light beams illuminate, from one direction, the portions PF and PG, while the second light beams illuminate, from another direction, the portions PF and PG of the document 34. At this time, the second light beams illuminate the mask plate 44. However, since the supporting portion 54 is formed with the hole 56 permitting the passing therethrough of the second light beams, the illumination of the second light beams is not obstructed by the supporting portion 54 of the mask plate 44. In addition, since the shielding portion 50 is disposed extending along the optical path of the second light beams, the second light beams illuminate the portions PF and PG of the document 34 without being interfered with by the shielding portion. Accordingly, the portions PF and PG of the document 34 are exposed, with uniformity and a sufficient amount of light, to the said light beams irradiated from said two directions. The portions PF and PG of the document 34 thus exposed to respective parts of the first and second light beams reflect these light beams toward the mirror 82, which further reflects those reflected light beams toward the photosensitive body (not shown). And the portions PF and PG of the document 34 are copied through the photosensitive body (not shown), thus obtaining such a copied paper 86 as shown in FIG. 8.

According to the first embodiment of the invention, the shielding portion 50 of the mask plate 44 extends along the path of the second light beams and the supporting portion 54 of the mask plate 44 has the hole 56 permitting the passage therethrough of the second light beams, as stated above. Therefore, the first and second light beams at all times illuminate uniformly and with a sufficient amount of light the exposure region of the loading board. Since, therefore, no portion of the mask plate is projected onto the copy paper as in the prior art, it is possible at all times to obtain a clear copy image or a copy image having no blur even if the amount of exposure light is varied.

Figure 8:
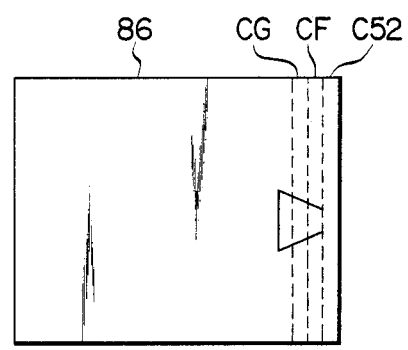
FIG. 8 is a top view of a copy paper obtained when the document shown in FIG. 7 is copied using the exposure apparatus shown in FIGS. 4 and 5.

Further, according to the first embodiment of the invention, when the forward end portion PE of the document 34 is in coincidence with the forward end portion E of the exposure region 33, the forward end portion PE of the document is at all times prevented from being copied but the shielding portion 50 is instead copied at its white colored face 52 onto the forward end portion of the copy paper, as shown in FIG. 8 by the notation C52. As a result, when the forward end portion PE of the document 34 reaches at a position immediately before its arrival at the forward end portion E of the exposure region 33, that is when the document 34 is, with a certain delay, carried and set by the automatic conveyor belt 40 onto the loading board 36, the white colored face 52 of the shielding portion 50 is exposed instead of the portion E of the exposure region 33. Thus, the stained conveyor belt is prevented from being exposed through the exposure region portion E, which prevents a resultant blurred copy.

Figure 9:
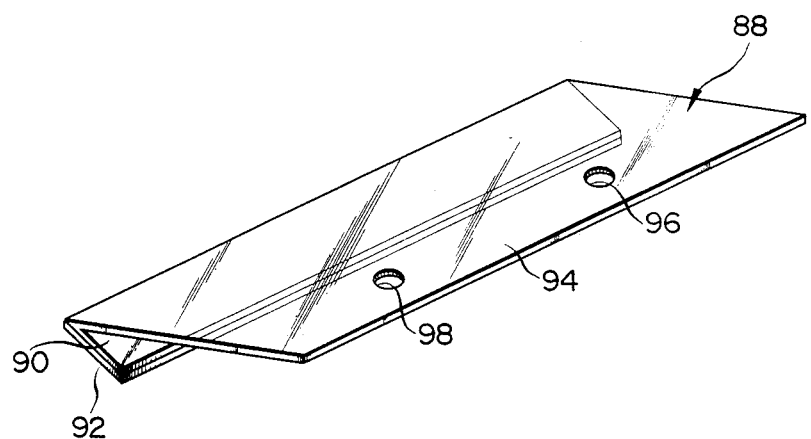
FIG. 9 is a perspective view of the mask member used in a second embodiment of the invention.

There will now be described the exposure apparatus according to a second embodiment of the invention with reference to FIGS. 4, 5, 7, 8 and 9. In this second embodiment, a mask plate 88 shown in FIG. 9 is used in place of the mask plate 44 used in the above-mentioned first embodiment. The other constituent parts and sections are the same as those used in the first embodiment, and therefore are denoted by like reference notations and their detailed description is omitted.

As shown in FIG. 9, the mask plate 88 used in this second embodiment is formed of transparent material such as, for example, a single sheet of glass or Mylar (trade name). The shielding portion 90 of the mask plate 88 extends along the optical axis of the second light beams irradiated when the exposure region 33 of the loading board 36 is exposed to those second light beams. The surface 92 of this shielding portion 90 is applied with a white colored coating. The supporting portion 94 of the mask plate 88 is formed with holes 96 and 98 for screwing the mask plate 88 to the member 48 of the exposure table 32.

According to the second embodiment, it is possible to obtain the same effect as that obtainable by the said first embodiment. That is, when the document 34 is, with some delay, carried and set by the automatic conveyor belt to a position immediately before its arrival at the forward end portion of the exposure region, the white colored face 92 of the shielding portion 90 is exposed in place of the forward end portion of the exposure region. Consequently, the stained conveyor belt is prevented from being copied, as in the case of the first embodiment. Further, the supporting portion 94 is formed of a transparent glass plate and therefore permits the passage therethrough of the second light beams advancing toward the exposure region. Accordingly, the exposure region 33 of the loading board 36 is exposed at all times with a uniform amount of light without being interfered with by the mask plate. That is, since it is impossible that any projection of the mask plate is produced as in the prior art, it is possible at all times to obtain a copy image having no blur even if the quantity of light for exposure is varied.

The present invention is not limited to the above-mentioned embodiments, but permits various changes or modifications to be made without departing from the spirit and scope of the invention. For example, in the above-mentioned first and second embodiments, the main body having the light source for emitting the light and the reflectors is provided on a movable basis, while the exposure table is provided on a fixed basis. And the exposure of the document is performed by the movement of the main body. However, the invention is not limited to such construction, but may be constructed such that the main body equipped with the light source and the reflectors is fixedly provided and the exposure table is movably provided, whereby the same effect as that obtainable by the construction of the said embodiments is gained through exposure of the document by the movement of the exposure table.

Further, the said second light beams illuminating the exposure region from one direction are those obtained by reflection of the light beams from the lamp used for the said first light beams. The invention, however, is not limited thereto, but permits the provision of another lamp so that the second light beams may be a combination of the light beams from this another lamp and the light beams prepared by reflection of these light beams.

Further, the mask plate formed of the transparent material shown in the said second embodiment is not limited to the transparent sheet of glass. That is, the invention makes it possible to obtain the same effect through the use of a transparent material, for example, a plastics material such as the material of which the mask plate is formed.

What is claimed is:

1. An exposure apparatus for exposing a subject to light and guiding the light reflected from the subject to a photosensitive body, said apparatus comprising:
    an exposure table including means defining an exposure region for receiving the subject and permitting illumination of the subject with light beams;
    light beam projecting means for projecting first light beams to the exposure region in one direction and second light beams in another direction to illuminate the subject with light beams;
    mask means including (a) a shielding portion having a white-colored face for shielding one portion of said exposure region from said first light beams; (b) a support portion integrally joined to said shielding portion; (c) means for fixing said support portion to said document table so that said shielding portion forwardly extends into said projected light beams; and (d) means defining a light beam transparent region intermediate said shielding and support portions to permit said second light beams to pass therethrough; and
    guide means for guiding light beams reflected from said exposure region to said photosensitive body.

2. An exposure apparatus as in claim 1 wherein said light beam transparent region is defined by an aperture formed in said mask means.

3. An exposure apparatus as in claim 1 wherein said light beam transparent region is defined by a region of lighttransparent material.

4. An exposure apparatus according to claim 1, wherein said light beam projecting means includes first means for projecting said first light beams in said one direction, and second means for projecting said second light beams in said another direction.

5. An exposure apparatus according to claim 4, wherein said first means includes light source means for emitting light, and first reflecting means for reflecting part of the light emitted from said light source means toward said exposure region.

6. An exposure apparatus according to claim 5, wherein said second means includes second reflecting means for reflecting part of the light emitted from said light source means toward said exposure region.

7. An exposure apparatus according to claim 6, wherein said first reflecting means and said second reflecting means respectively include mirrors for reflecting part of the light emitted from said light source toward said exposure region.

8. An exposure apparatus according to claim 1, wherein said support portion is formed of a transparent material.

9. An exposure apparatus according to claim 8, wherein said transparent material consists of glass.

10. An exposure apparatus according to claim 1, wherein said mask means is formed from a transparent plate; and a portion of said transparent plate corresponding to said shielding portion is applied with a white coating.

11. An exposure apparatus according to claim 10, wherein said transparent plate consists of glass.

12. An exposure apparatus according to claim 1, wherein said mask means is formed from an opaque plate; and said shielding portion is applied with a white coating while said support portion is formed with holes for permitting the passage therethrough of the one of said second light beams which advance toward said exposure region.

13. An exposure apparatus according to claim 12, wherein said opaque plate consists of metal.

14. An exposure apparatus according to claim 1, wherein said guide means is provided with a mirror for guiding the light reflected from said exposure region toward said photosensitive body.

* * * * *